United States Patent
Deshpande et al.

(10) Patent No.: US 11,379,261 B2
(45) Date of Patent: Jul. 5, 2022

(54) SYSTEMS AND METHODS FOR AUTOMATICALLY CREATING AN IMAGE PROCESSING PIPELINE

(71) Applicant: Tata Consultancy Services Limited, Mumbai (IN)

(72) Inventors: Shailesh Deshpande, Pune (IN); Asha Rajbhoj, Pune (IN); Jayavardhana Rama Gubbi Lakshminarasimha, Bangalore (IN); Vinay Kulkarni, Pune (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 500 days.

(21) Appl. No.: 16/681,658

(22) Filed: Nov. 12, 2019

(65) Prior Publication Data
US 2021/0141663 A1 May 13, 2021

(51) Int. Cl.
*G06F 9/48* (2006.01)
*G06N 5/02* (2006.01)
(Continued)

(52) U.S. Cl.
CPC .......... *G06F 9/4843* (2013.01); *G06N 5/003* (2013.01); *G06N 5/027* (2013.01); *G06N 5/04* (2013.01); *G06N 7/02* (2013.01); *G06N 20/00* (2019.01)

(58) Field of Classification Search
CPC .......... G06N 7/02; G06N 5/04; G06N 5/027; G06N 5/003; G06N 20/00; G06F 9/4843
See application file for complete search history.

(56) References Cited

U.S. PATENT DOCUMENTS 5,325,445 A * 6/1994 Herbert ................ G06K 9/6282
382/228
5,995,996 A 11/1999 Venable
(Continued)

FOREIGN PATENT DOCUMENTS

EP 0875854 11/1998

OTHER PUBLICATIONS

Bastiani et al., "Automated processing pipeline for neonatal diffusion MRI in the developing Human Connectome Project" (Year: 2018).*

(Continued)

*Primary Examiner* — Phillip H Nguyen
(74) *Attorney, Agent, or Firm* — Finnegan, Henderson, Farabow, Garrett & Dunner LLP

(57) ABSTRACT

This disclosure relates to automatic creation of an image processing pipeline that has a dependency on image processing domain experts. Given the image processing problem has multiple viable solutions, search space of creating a solution for a given goal in a given constrained infrastructure is large and, choosing an optimal image processing solution is an effort, time and intellect intensive endeavor. The present disclosure models image processing goals in abstract task categories and externalizes domain knowledge as an object model and a set of rules defined over it. Rules codify task template selection criteria and algorithm selection criteria for implementing a task. Recommendations are provided to choose suitable algorithm (s) for carrying out image processing tasks. Effects of algorithm execution are recorded for subsequent tasks recommendations. The stored state of execution and trace information enables rerouting the execution and knowledge upgrade. Deployable code is generated after a validated pipeline is created.

20 Claims, 8 Drawing Sheets

(51) Int. Cl.
    *G06N 5/04*         (2006.01)
    *G06N 7/02*         (2006.01)
    *G06N 5/00*         (2006.01)
    *G06N 20/00*       (2019.01)

(56) References Cited

U.S. PATENT DOCUMENTS

| | | |
|---|---|---|
| 7,317,827 B2 | 1/2008 | Munsil |
| 9,396,037 B2 | 7/2016 | Morsi et al. |
| 2010/0053211 A1* | 3/2010 | Ingermanson ....... G06K 9/6253 345/626 |

OTHER PUBLICATIONS

Chen et al., "Learning to See in the Dark" (Year. 2018).*
Jiang et al., "Learning the Image Processing Pipeline" (Year. 2017).*
Jubery et al., "Using Machine Learning to Develop a Fully Automated Soybean Nodule Acquisition Pipeline (SNAP)" (Year. 2021).*
Tian et al., "Automatically designing an image processing pipeline fora five-band camera prototype using the Local, Linear, Learned (L3)" (Year. 2015).*
Costa, G.A.O.P et al. (Sep. 2016). "An object-based meta knowledge model for a distributed image interpretation system," located at https//www resesrchgate.net/publication/310795810 An object-based meta knowledae model for a distributed image interpretation system; 6 pages.

* cited by examiner

SYSTEMS AND METHODS FOR AUTOMATICALLY CREATING AN IMAGE PROCESSING PIPELINE

TECHNICAL FIELD

This disclosure relates generally to image processing, and more particularly to automatically creating an image processing pipeline.

BACKGROUND

Because of exponential increase in industrial and consumer grade imaging devices, the number of situations requiring image processing solutions are increasing at a rapid rate. Each of these solutions may use different image acquisition platform, and may be applied to many different situations, for example, satellite imagery for monitoring crop-produce or images by a cell phone for detecting damages in household equipment. A specific image processing task can be achieved by many different algorithms with different qualities. Conventional practices rely on experts to choose the most appropriate algorithm(s) based on an end goal and sub-goals. State-of-the-art attempts to automate specific image processing tasks. However, automation support for an image processing pipeline to satisfy a complex goal structure is a challenge that is currently largely dependent on image processing domain experts, the complexity arising because of the number of combinations possible, lack of understanding of the domain and the symbol grounding issue. Given the image processing problem has multiple viable solutions, search space of creating a suitable solution using available algorithms for a given goal in a given constrained infrastructure (process and machinery related constraints such as Graphics processing unit, Central processing unit, cycle time, etc.) is generally large. The exploratory work to choose an optimal image processing solution is an effort, time and intellect-intensive endeavor.

SUMMARY

Embodiments of the present disclosure present technological improvements as solutions to one or more of the above-mentioned technical problems recognized by the inventors in conventional systems.

In an aspect, there is provided a processor implemented method for automatically creating an image processing pipeline, the method comprising the steps of: receiving, via one or more hardware processors, an input data comprising an input goal and one or more images to be processed for achieving the input goal, the input data being characterized by a plurality of input properties corresponding to the input goal and the one or more images; creating a context model, via the one or more hardware processors, in the form of an instance of a context meta model, wherein the context meta model is configured to capture context of a domain having a property goalDescription corresponding to the input goal, and wherein the context meta model is characterized by a plurality of types of contexts including (i) a DomainContext representing domain related information, (ii) an InputContext representing information pertaining to the one or more images and (iii) a ProcessingContext representing information pertaining to the one or more hardware processors; creating a potential image processing pipeline, via the one or more hardware processors, based on a solution meta model, wherein the solution meta model is characterized by one or more algorithms associated with the DomainContext for performing a plurality of tasks corresponding to the input goal, and wherein each of the plurality of tasks are associated with (i) a TaskType from a plurality of TaskTypes (ii) a TaskTemplate representing a reusable task sequence for the input data using a taskOrder and (iii) the one or more algorithms for performing an associated task; creating a rule model, via the one or more hardware processors based on a rule meta model, wherein the rule meta model is configured to capture knowledge pertaining to the DomainContext and wherein the rule model is characterized by a plurality of rules of types including (i) TemplateRule representing rules for selecting the TaskTemplate from a list of TaskTemplate, for each of the plurality of tasks, (ii) AlgoRule representing rules for selecting an algorithm from the one or more algorithms for performing an associated task in the TaskTemplate based on the context model and (iii) PropRule representing rules for updating properties of the one or more images based on execution of a selected algorithm; obtaining, via the one or more hardware processors, the taskOrder representing an order of execution of the plurality of tasks by performing execution of the TemplateRule for selection of the TaskTemplate pertaining to the goalDescription; and executing, via the one or more hardware processors, one or more rules from the plurality of rules, comprised in AlgoRule, corresponding to each of the plurality of tasks based on the obtained order of execution of the plurality of tasks to obtain a recommended algorithm for each of the plurality of tasks; executing, via the one or more hardware processors, the recommended algorithm for each of the plurality of tasks; and validating, via the one or more hardware processors, the potential image processing pipeline to obtain a validated image processing pipeline corresponding to the input goal using a continually updated model based Knowledge Repository comprising the context meta model, the solution meta model, the rule meta model and algorithmic services corresponding to the one or more algorithms, by dynamically performing: on execution of the recommended algorithm, validating an outcome associated thereof for each of the plurality of tasks for input and output consistency; and on execution of the one or more rules, validating the one or more rules corresponding to each of the plurality of tasks based on dynamic updation of the InputContext of the context model.

In another aspect, there is provided a system for automatically creating an image processing pipeline, the system comprising: one or more data storage devices operatively coupled to one or more hardware processors and configured to store instructions configured for execution via the one or more hardware processors to: receive an input data comprising an input goal and one or more images to be processed for achieving the input goal, the input data being characterized by a plurality of input properties corresponding to the input goal and the one or more images; create a context model in the form of an instance of a context meta model, wherein the context meta model is configured to capture context of a domain having a property goalDescription corresponding to the input goal, and wherein the context meta model is characterized by a plurality of types of contexts including (i) a DomainContext representing domain related information, (ii) an InputContext representing information pertaining to the one or more images and (iii) a ProcessingContext representing information pertaining to the one or more hardware processors; create a potential image processing pipeline, based on a solution meta model, wherein the solution meta model is characterized by one or more algorithms associated with the DomainContext for performing a plurality of tasks corresponding to the input goal, and wherein each of the plurality of tasks are associated with (i) a TaskType from a plurality of TaskTypes (ii) a TaskTemplate representing a reusable task sequence for the input data using a taskOrder and (iii) the one or more algorithms for performing an associated task; create a rule model based on a rule meta model, wherein the rule meta model is configured to capture knowledge pertaining to the DomainContext and wherein the rule model is characterized by a plurality of rules of types including (i) TemplateRule representing rules for selecting the TaskTemplate from a list of TaskTemplate, for each of the plurality of tasks, (ii) AlgoRule representing rules for selecting an algorithm from the one or more algorithms for performing an associated task in the TaskTemplate based on the context model and (iii) PropRule representing rules for updating properties of the one or more images based on execution of a selected algorithm; obtain the taskOrder representing an order of execution of the plurality of tasks by performing execution of the TemplateRule for selection of the TaskTemplate pertaining to the goalDescription; and execute one or more rules from the plurality of rules, comprised in AlgoRule, corresponding to each of the plurality of tasks based on the obtained order of execution of the plurality of tasks to obtain a recommended algorithm for each of the plurality of tasks; execute the recommended algorithm for each of the plurality of tasks; and validate the potential image processing pipeline to obtain a validated image processing pipeline corresponding to the input goal using a continually updated model based Knowledge Repository comprised in the one or more data storage devices, the Knowledge Repository comprising the context meta model, the solution meta model, the rule meta model and algorithmic services corresponding to the one or more lgorithms, by dynamically performing: on execution of the recommended algorithm, validating an outcome associated thereof for each of the plurality of tasks for input and output consistency; and on execution of the one or more rules, validating the one or more rules corresponding to each of the plurality of tasks based on dynamic updation of the InputContext of the context model.

In yet another aspect, there is provided a computer program product comprising a non-transitory computer readable medium having a computer readable program embodied therein, wherein the computer readable program, when executed on a computing device, causes the computing device to: receive, via one or more hardware processors, an input data comprising an input goal and one or more images to be processed for achieving the input goal, the input data being characterized by a plurality of input properties corresponding to the input goal and the one or more images; create a context model in the form of an instance of a context meta model, wherein the context meta model is configured to capture context of a domain having a property goalDescription corresponding to the input goal, and wherein the context meta model is characterized by a plurality of types of contexts including (i) a DomainContext representing domain related information, (ii) an InputContext representing information pertaining to the one or more images and (iii) a ProcessingContext representing information pertaining to the one or more hardware processors; create a potential image processing pipeline, based on a solution meta model, wherein the solution meta model is characterized by one or more algorithms associated with the DomainContext for performing a plurality of tasks corresponding to the input goal, and wherein each of the plurality of tasks are associated with (i) a TaskType from a plurality of TaskTypes (ii) a TaskTemplate representing a reusable task sequence for the input data using a taskOrder and (iii) the one or more algorithms for performing an associated task; create a rule model based on a rule meta model, wherein the rule meta model is configured to capture knowledge pertaining to the DomainContext and wherein the rule model is characterized by a plurality of rules of types including (i) TemplateRule representing rules for selecting the TaskTemplate from a list of TaskTemplate, for each of the plurality of tasks, (ii) AlgoRule representing rules for selecting an algorithm from the one or more algorithms for performing an associated task in the TaskTemplate based on the context model and (iii) PropRule representing rules for updating properties of the one or more images based on execution of a selected algorithm; obtain the taskOrder representing an order of execution of the plurality of tasks by performing execution of the TemplateRule for selection of the TaskTemplate pertaining to the goalDescription; and execute one or more rules from the plurality of rules, comprised in AlgoRule, corresponding to each of the plurality of tasks based on the obtained order of execution of the plurality of tasks to obtain a recommended algorithm for each of the plurality of tasks; execute the recommended algorithm for each of the plurality of tasks; and validate the potential image processing pipeline to obtain a validated image processing pipeline corresponding to the input goal using a continually updated model based Knowledge Repository comprised in the one or more data storage devices, the Knowledge Repository comprising the context meta model, the solution meta model, the rule meta model and algorithmic services corresponding to the one or more algorithms, by dynamically performing: on execution of the recommended algorithm, validating an outcome associated thereof for each of the plurality of tasks for input and output consistency; and on execution of the one or more rules, validating the one or more rules corresponding to each of the plurality of tasks based on dynamic updation of the InputContext of the context model.

In accordance with an embodiment of the present disclosure, the one or more hardware processors are further configured to: generate a deployable code based on the validated image processing pipeline; and continually update the Knowledge Repository with (i) the validated image processing pipeline, (ii) the deployable code, (iii) the context model, (iv) the potential image processing pipeline, (v) the rule model, (vi) each state of execution as a stack of state entries, wherein each state entry is a tuple comprising the TaskType, state of the context model characterized by the input properties, and {algorithm name, <parameter name, parameter value>} and (vii) trace information corresponding to navigation from one state of execution to another via the validated image processing pipeline.

In accordance with an embodiment of the present disclosure, (i) the domain related information comprises business domain and domain objects details; (ii) the information pertaining to the one or more images comprises image spectral and spatial characteristics, image contrast level, edge density, image format, noise information; band related information including directivity, entropy, linearity, periodicity, size and length; and sensor related information including azimuth angle, band width, interval at which the one or more images are taken, look angle, spatial and temporal resolution and zenith angle; and (iii) the information pertaining to the one or more hardware processors comprises processing related constraints including time constraint, batch or parallel processing and processing window size.

In accordance with an embodiment of the present disclosure, the plurality of TaskTypes include Transform, Prepare, Focus, Perceive and Quantify, wherein Transform and Prepare are configured to preprocess the one or more images to obtain transformed one or more images for further processing, Focus is configured to highlight regions of interest (ROIs) in the transformed one or more images and Perceive and Quantify are configured to interpret the ROIs in the one or more images to generate a required output for achieving the input goal, the ROIs being comprised in the plurality of input properties.

In accordance with an embodiment of the present disclosure, the one or more hardware processors are further configured to re-route the execution to a previous state of execution when validating the potential image processing pipeline.

In accordance with an embodiment of the present disclosure, the one or more hardware processors are further configured to validate an outcome associated with the recommended algorithm comprises modifying the taskOrder based on the outcome associated with each of the recommended algorithm for each of the plurality of tasks.

In accordance with an embodiment of the present disclosure, the one or more hardware processors are further configured to perform fuzzy transformation of numerical values associated with the input data to qualitative ranges prior to executing the one or more rules.

In accordance with an embodiment of the present disclosure, the one or more hardware processors are further configured to execute the PropRule to cascade effects of changes in the context model when validating the one or more rules.

In accordance with an embodiment of the present disclosure, the one or more hardware processors are further configured to obtain an order of execution of the plurality of tasks comprises using a default task type sequence of Transform, Prepare, Perceive, Focus, and Quantify if execution of the TemplateRule does not provide a TaskTemplate.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
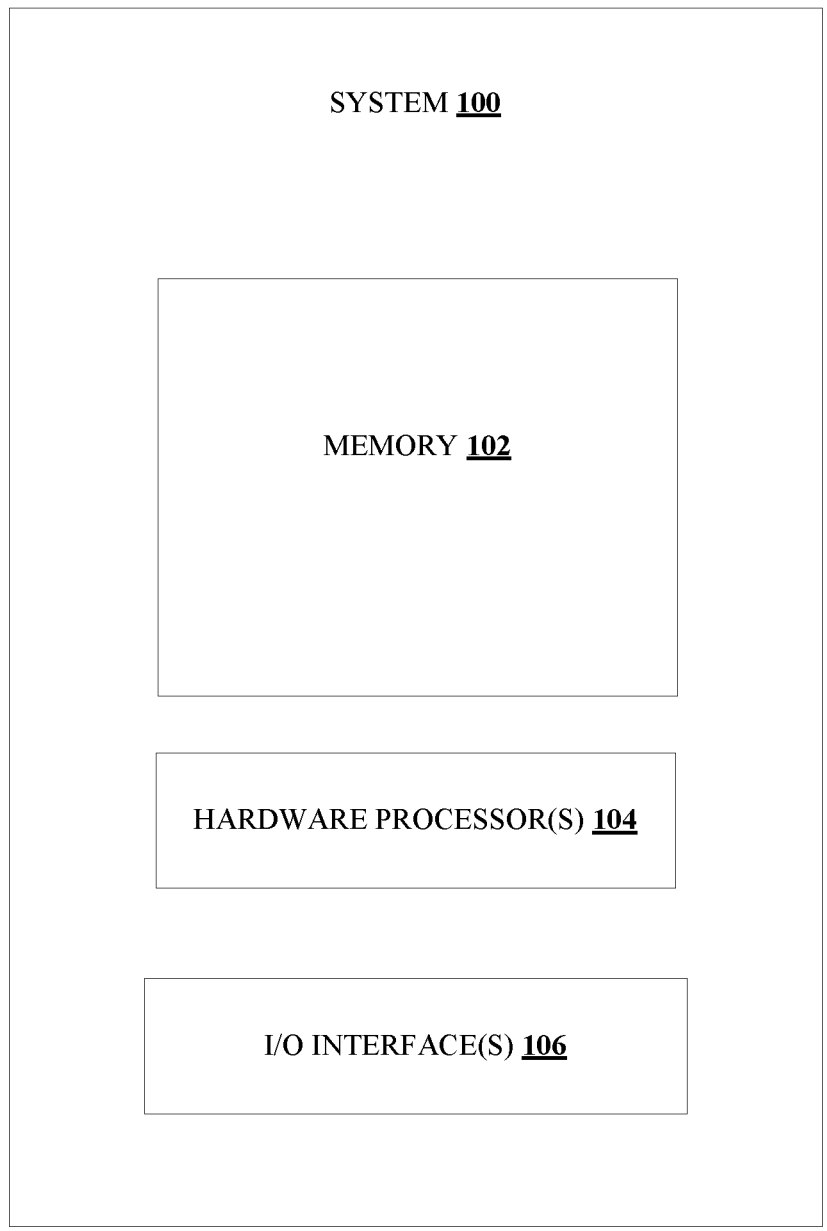
FIG. 1 illustrates an exemplary block diagram of a system for automatically creating an image processing pipeline, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Creating an image processing pipeline, that is, a sequence of atomic image processing functions, for a given scene understanding (including quantification) is a challenging task. Firstly, many aspects of human vision are not very well understood yet. Hence, mundane tasks for human vision may remain complex for computational methods. Developing an image processing algorithm that generalizes well and works in different situations (e.g. attention model depending on portion of the image needing attention, foreground-background recognition) similarly to human vision, considering the huge number of combinations of tasks and algorithms possible, is a technical problem addressed by the systems and methods of the present disclosure. Secondly, combining different image processing services of atomic nature to achieve a desired end goal requires a sound understanding of the domain associated with the image, associated data and the goal. For instance, what algorithms to use, understanding content of the image, noise level, requirements corresponding to the goal, and the like, constitute domain knowledge. Naturally, the creation of an optimal image processing pipeline for a given end goal has long been handled by experts. However, the manual approach is effort, time and intellect intensive requiring exploratory empirical work, and the approach may lead to a biased, subjective solution for a specific goal. State-of-the-art has also attempted to model knowledge for a very specific image processing task, wherein image processing logic for object identification and associated control logic are separated. For instance, knowledge for a specific task like identification of vegetation using a unique signature of wavelength was known. Again, using geometric properties of elongated rectangular structures identified in images were used for identifying say roads in the images. Such solutions do not generalize well and work in constrained conditions. Also, an end-to-end image processing pipeline is not created.

Some state-of-the-art include a knowledge-based system developed by Rost and Munkel in 1998 to make an image processing algorithm adaptable to changing conditions, wherein a rule base captures expert knowledge for configuration of steps and for changing the algorithm parameter values based on feedback. Renouf et al. developed an ontology in 2007 for describing image processing objectives and image class models. The system constructs image processing formulation using 300 concepts, 23 roles and 183 restrictions written in Web Ontology Language (OWL). Clourad et al. in 2010 investigated information used in design and evaluation of image processing software applications and provided a computational language to describe them. The goal is defined using sample output images and task description. A framework developed by Nadarajan et al. focuses on automating different stages of video processing mainly design, workflow, and processing layer. The knowledge related to each task is abstracted in three layers namely goal ontologies, video description, and capabilities. The workflow engine controls the complete system. It uses the knowledge related to the goal, video data and, capabilities and requests a planner to create a plan for a given condition. Based on the plan, the workflow enactor creates an executable script and using the capabilities available in the processing layer, the plan is executed. Many Workflow Management Systems (WMS) have attempted to solve the problem of automating construction of a scientific workflow. The Pegasus WMS maps a workflow description on distributed computing environment. The key concept of the system is the separation of workflow description and description of running environment. Scientific computation steps are represented as a graph of task nodes, which are connected with dependency edges. The workflow is manually created by expert users. These WMS systems do not provide intelligence to select the services automatically. Other resources such as image processing libraries, vision workbench, and the like provide micro and macro level resources for programing image processing tasks. These resources are difficult to use for building a complex (considering the number of possibilities and lack of domain understanding) image processing pipeline, without a sound knowledge of image processing. With increasing demand for image processing solutions, different image acquisition platforms are being developed to meet the need. Accordingly, the possible different algorithms for achieving a specific image processing task is huge depending on the qualities required.

The present disclosure addresses the aforementioned technical problem using a modeling approach that models image processing goals in abstract task categories and externalizes image processing domain knowledge as an object model and a set of rules defined over it. Rules codify task template selection criteria and algorithm selection criteria for implementing a task. Recommendations are provided to choose suitable algorithm(s) for carrying out image processing tasks. Effects of algorithm execution are recorded in a context and considered for subsequent tasks recommendations. State of execution is also stored, which enables rerouting the execution to initial stages, if required. Furthermore, deployable code is generated after creation of a validated image processing pipeline. Trace information generated can be used further for knowledge upgrade to improve results over a period of time.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method FIG. 1 illustrates an exemplary block diagram of a system for automatically creating an image processing pipeline, in accordance with some embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (refer FIG. 2) of the system 100 can be stored in the memory 102.

Figure 2:
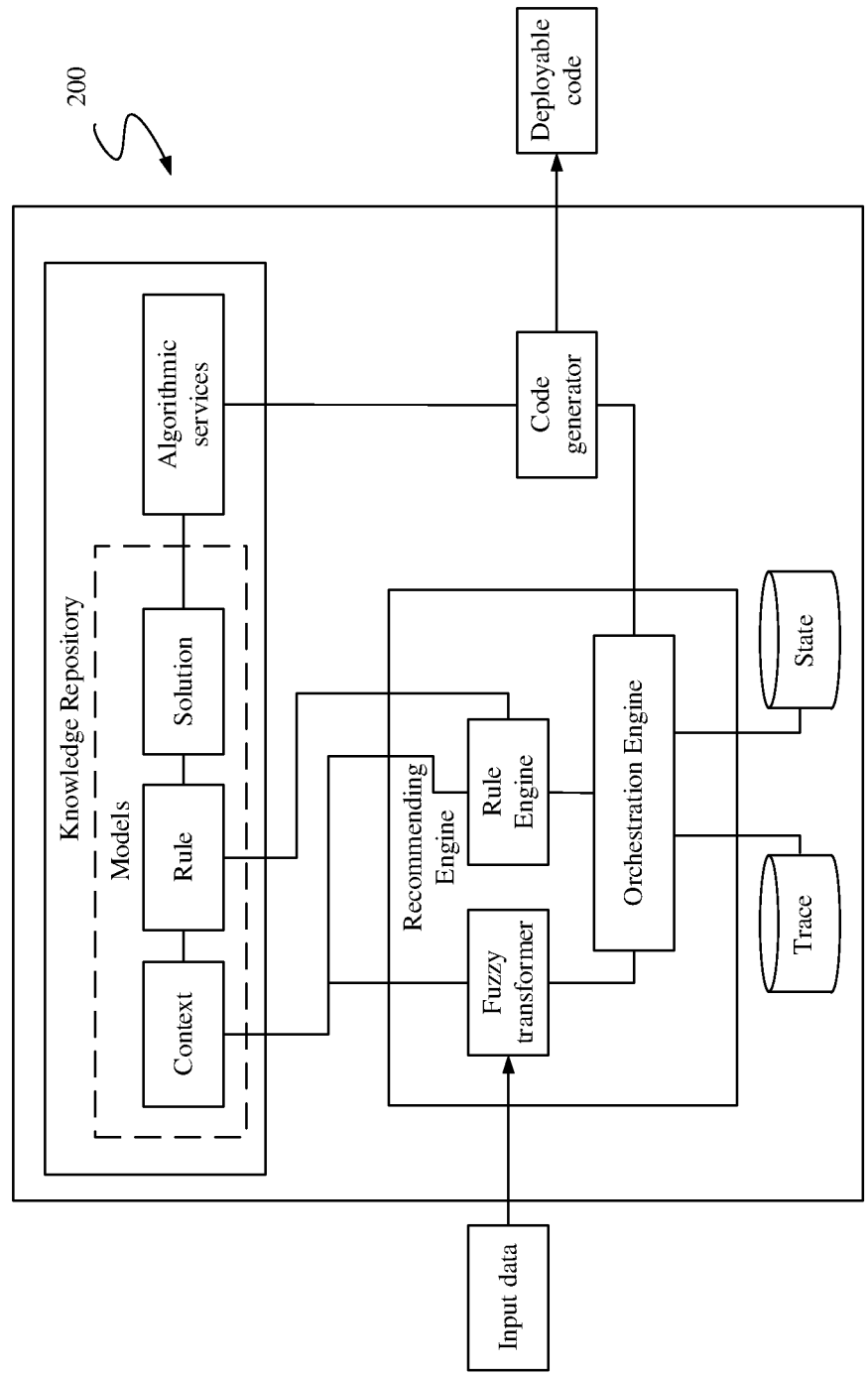
FIG. 2 illustrates a functional block diagram for the system of FIG. 1, in accordance with some embodiments of the present disclosure.

FIG. 2 illustrates a functional block diagram 200 for the system of FIG. 1, wherein, in accordance with an embodiment, the one or more hardware processors 104 serve as a recommending engine and a code generator while a knowledge repository may be comprised in the memory 102. An input data to the system includes essentially problem details (input goal) and input images. Constraints, if provided, result in a better output. For instance, atmospheric data may serve as constraints and if provided, improve the output of the system. In the absence of constraints, an optimal output is generated by the system. The output of the system is a generated deployable code corresponding to the input goal.

The knowledge repository comprises models and algorithm services. The models contain solution space (tasks, algorithms) for control logic or decision-making knowhow using rules, and object/context model for problem domain which covers domain, input and output context information. Algorithm Services contain implementation options for the solution space and is executed when based on a recommended algorithm. In an embodiment, the algorithm services are prebuilt components, generic local services or any services accessible through Application Programming Interface (API). The algorithm services are recommended based on a given problem context information.

The recommending engine consists of a rule engine, a fuzzy transformer and an orchestration engine. In the rule engine, different types of rules are specified on the properties of the context model. In an embodiment, the rule engine is created using Drools (https://www.drools.org). The orchestration engine controls the rule engine by suggesting which rules to execute. Particularly, the orchestration engine navigates the rule engine through various tasks, shows retrieved algorithm recommendations for a task under consideration corresponding to the goal, provides an interface to select parameters of the retrieved algorithm, provides visualization of the effects such as the context model changes as well as transformed images. The orchestration engine stores state information, characterized by input properties of the context model, to facilitate "undo" action by traversing back in a pipeline creation process by restoring execution to a previous state. It generates a trace information that can be used in continuous improvement over solution building process as well as solution usage. In accordance with the present disclosure, the input data may be specified by a domain expert. A set of initialization functions may calculate the values for the input data based on a numeric threshold.

Alternatively, the fuzzy transformer has a collection of fuzzy membership functions defined over attribute values space that convert numeric values into fuzzy variables. The fuzzy transformer transforms the input data into a normalized form. In an embodiment, an appropriate fuzzy membership function for a fuzzification task is chosen by the system, based on a mapping of variables in the input data and fuzzy function in a lookup table. Once the fuzzy function is chosen, the numeric values are converted into fuzzy variables indicating degree such as high, moderate, low, etc. For example, average brightness of the image is converted to qualitative range values such as <very high average low and very low>.

On successful creation of an image processing pipeline, a code is generated by the model-based code generator, which may be used in standalone manner for actual deployment. The generation steps take care of invoking algorithms in a finalized pipeline in a sequence by instantiating and interfacing with the input and output of algorithms.

Figure 3A:
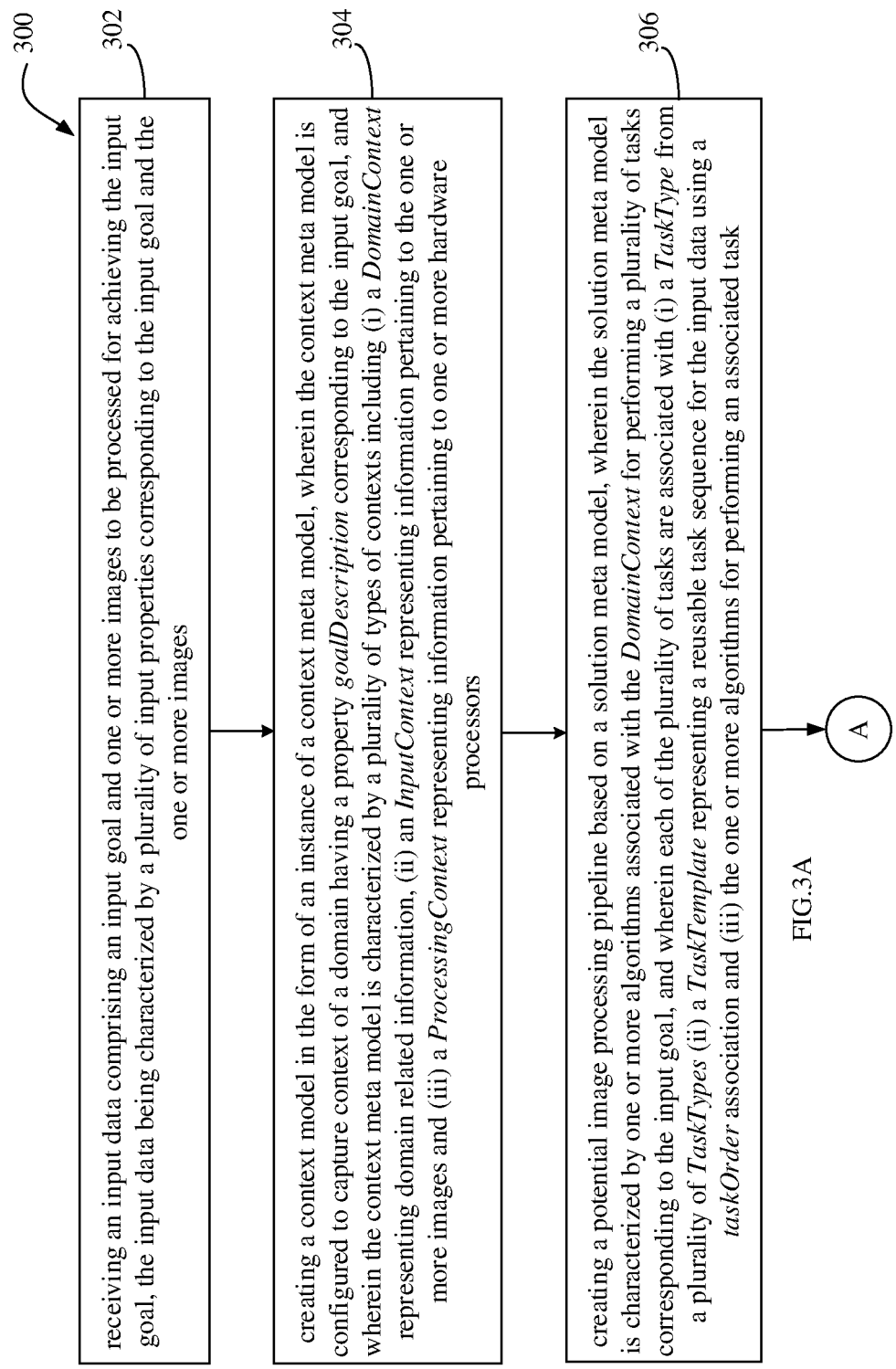
FIG. 3A through FIG. 3C illustrate an exemplary flow diagram of a computer implemented method for automatically creating an image processing pipeline, in accordance with some embodiments of the present disclosure.
Figure 3B:
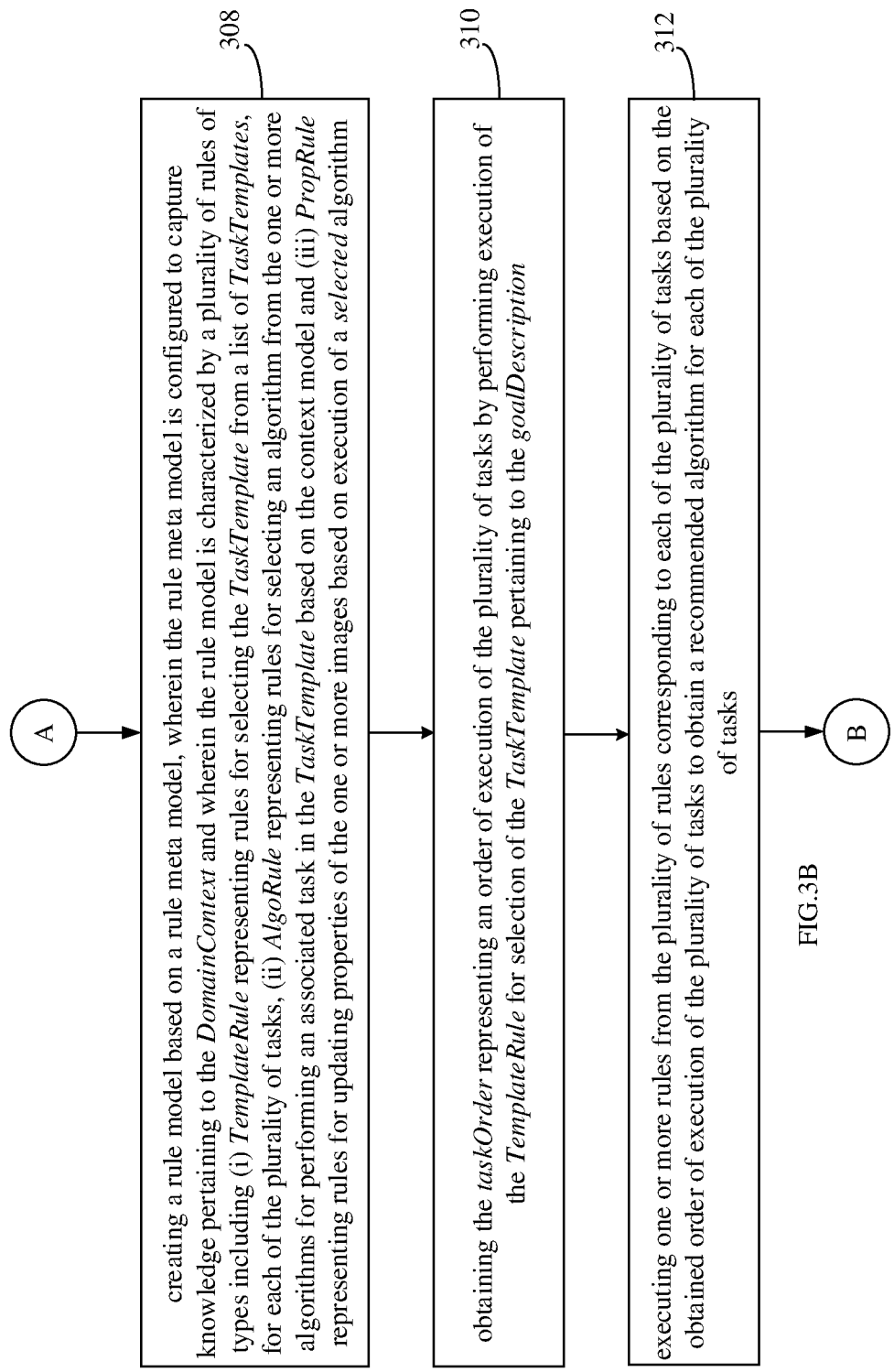
Figure 3C:
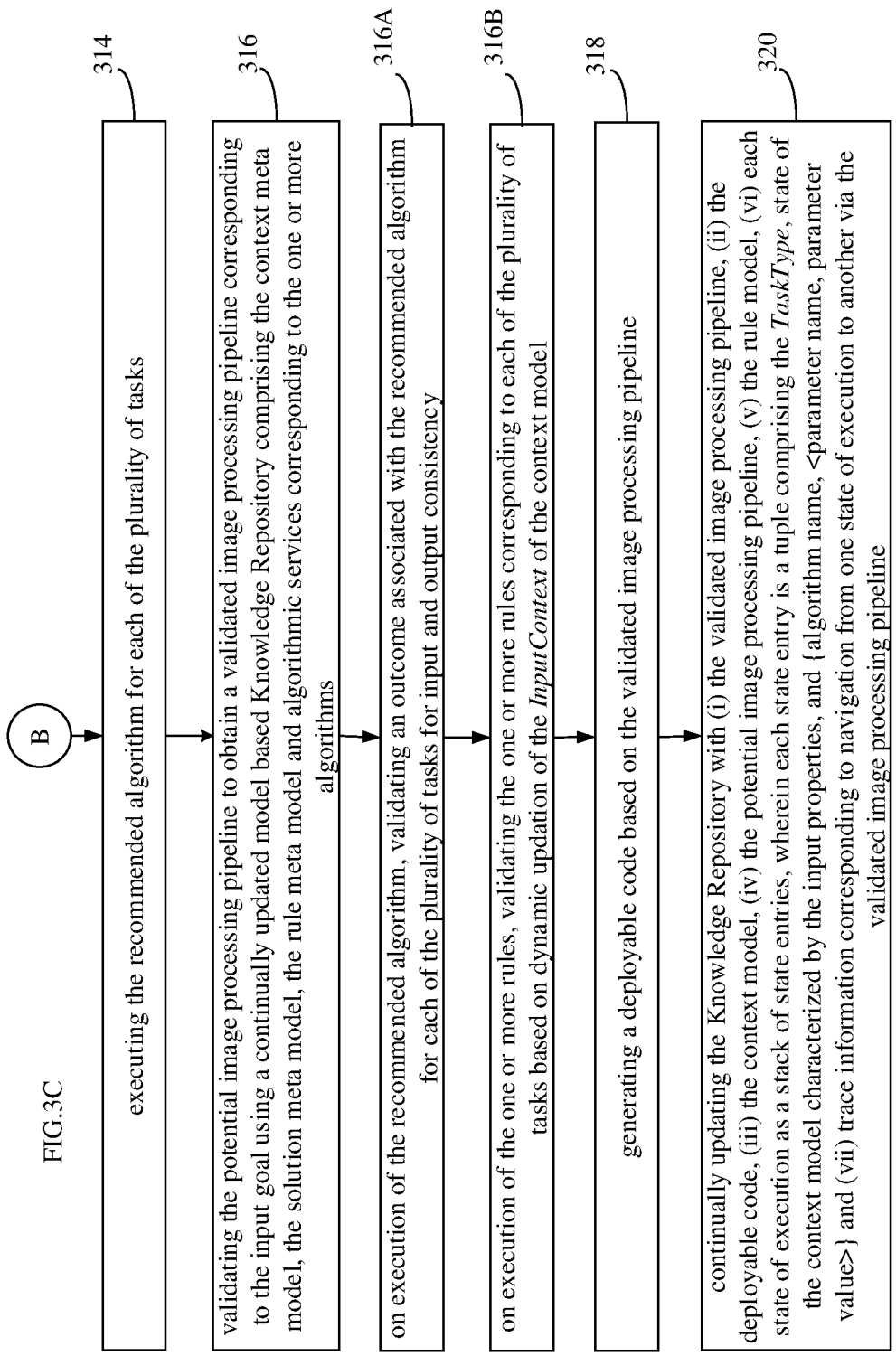

FIG. 3A through FIG. 3C illustrate an exemplary flow diagram of a computer implemented method 300 for automatically creating an image processing pipeline, in accordance with some embodiments of the present disclosure. In an embodiment, the system 100 includes one or more data storage devices or memory 102 operatively coupled to the one or more processors 104 and is configured to store instructions configured for execution of steps of the method 300 by the one or more processors 104. The steps of the method 300 will now be explained in detail with reference to the components of the system 100 of FIG. 1 and the functional block diagram 200 for the same. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more processors 104 are configured to receive, at step 302, an input data comprising an input goal and one or more images to be processed for achieving the input goal, the input data being characterized by a plurality of input properties corresponding to the input goal and the one or more images.

Figure 4:
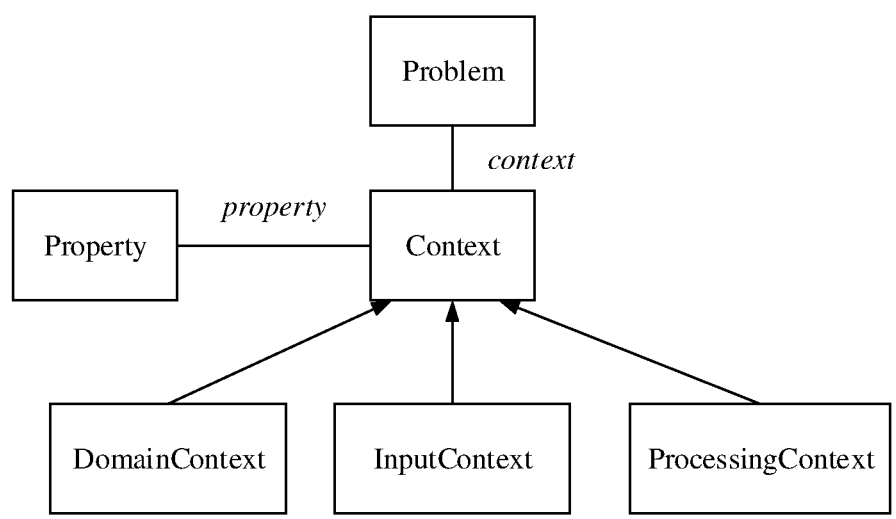
FIG. 4 is a block diagram representing a context meta model according to some embodiments of the present disclosure.

In accordance with an embodiment of the present disclosure, the one or more processors 104 are configured to create a context model, at step 304, in the form of an instance of a context meta model. FIG. 4 is a block diagram representing a context meta model according to some embodiments of the present disclosure. In the context of the present disclosure, the expressions used in italics in the description below refer to elements of the meta models (classes, properties and associations) described hereinafter. An image processing problem under consideration is defined using Problem class. It has a property goalDescription to specify the input goal to be achieved through processing. Every Problem specifies Context information. Context is described by Property. In an embodiment, the context meta model is configured to capture context of a domain having the property goalDescription corresponding to the input goal, and wherein the context meta model is characterized by a plurality of types of contexts including (i) a DomainContext representing domain related information, (ii) an InputContext representing information pertaining to the one or more images and (iii) a ProcessingContext representing information pertaining to the one or more hardware processors.

In accordance with an embodiment of the present disclosure, the input properties (Attributes) and values (Options) are provided below in Table I.

TABLE I

| Context | Attributes |
|---|---|
| InputContext | spectralChar, spatialChar, EdgeDensity, Edge Contrast, ImageContrast, Image Intensity, singleDateImage, atmosphericData, platform |
| ProcessingContext | classificationGranularity, goalType, Area of Interest (AOI), visualAnalysisRequired, |
| DomainContext | domainMarket |

| Context Attributes | Options |
|---|---|
| AOI | latLong, row_column |
| domainMarket | ecology, forestry, medical, mine, movie, news, resourceExploration, urban |
| processingTime | offline, online, real |
| spectralChar | short wave infrared (SWIR), visible and near infrared (VNIR), hyper, multi, thermal, visible |
| spatialResolution | coarse, moderate, high, veryhigh |
| goalType | objectDetection, classification, changeDetection, Land Use Land Cover (LULC) changes |
| singleDateImage | true, false |
| atmosphericData & visualAnalysisRequired | yes, no |
| Platform | satellite, drone, robotVehicle, aircraft |

In accordance with an embodiment of the present disclosure, (i) the domain related information comprises business domain and domain objects details; (ii) the information pertaining to the one or more images comprises image spectral and spatial characteristics, image contrast level, edge density, image format, noise information; band related information including directivity, entropy, linearity, periodicity, size and length; and sensor related information including azimuth angle, band width, interval at which the one or more images are taken, look angle, spatial and temporal resolution and zenith angle; and (iii) the information pertaining to the one or more hardware processors comprises processing related constraints including time constraint, batch or parallel processing and processing window size.

In accordance with the present disclosure, data types of Property are abstracted to specify range values instead of actual values. Some examples are as shown below:
  (i) Image quality related attributes such as contrast, edge density, visibility, entropy, periodicity, image visibility are specified with ranges <poor, low, belowaverage, average, high, veryhigh>
  (ii) Spatial characteristics are specified as <coarse, moderate, high, veryhigh>
  (iii) Spectral characteristics are specified as <SWIR, VNIR, hyper, multi, thermal, visible>
  (iv) Noise types considered are <columnDrop, lineDrop, random, saltandpepper, speckled>

Figure 5:
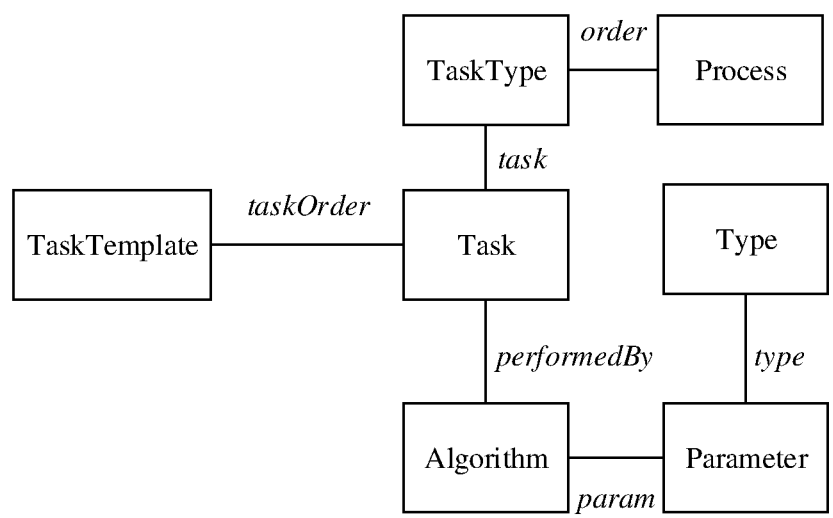
FIG. 5 is a block diagram representing a solution meta model according to some embodiments of the present disclosure.

In accordance with an embodiment of the present disclosure, the one or more processors 104 are configured to create a potential image processing pipeline, at step 306, based on a solution meta model. FIG. 5 is a block diagram representing a solution meta model according to some embodiments of the present disclosure. The solution meta model helps in decomposing the solution space into granular, atomic computational services that can be used to perform specific processing tasks. In an embodiment, the solution meta model is characterized by one or more algorithms associated with the DomainContext for performing a plurality of tasks corresponding to the input goal, and wherein each of the plurality of tasks are associated with (i) a TaskType from a plurality of TaskTypes (ii) a TaskTemplate representing a reusable task sequence for the input data using a taskOrder (association) and (iii) one or more algorithms for performing an associated task. Often, computation intensive software follows a specific process that defines an order in which processing tasks need to be performed. For instance, first preprocessing of an input maybe done before processing of the input to retrieve meaningful information. These processing tasks are categorized using TaskType. Process defines a default order in which the plurality of TaskTypes are executed in an image processing pipeline. TaskTemplate helps in defining the task specific execution order using the taskOrder. A Task may be performed using many Algorithm. Algorithm may take one or more Parameters as inputs. The Parameters have a Type. TaskType and taskOrder information help in navigating through the tasks for recommendation of Algorithm.

In accordance with an embodiment of the present disclosure, image processing tasks may be classified into a plurality of types. Accordingly, the plurality of TaskTypes include Transform, Prepare, Focus, Perceive and Quantify, wherein Transform and Prepare are configured to preprocess the one or more images to obtain transformed one or more images for further processing, Focus is configured to highlight regions of interest (ROIs) in the transformed one or more images and Perceive and Quantify are configured to interpret the ROIs in the one or more images to generate a required output for achieving the input goal, the ROIs being comprised in the plurality of input properties. It may be noted that the complete image or a portion of the image may be processed depending on the input goal and need for quality. For computational efficiency, a suitable ROI may be processed based on an appropriate attention model.

Table II below shows a few examples of TaskType in accordance with the present disclosure.

TABLE II

| TaskType | Task |
| --- | --- |
| Transform | 2D to 3D conversion, Digital Number Transformation (DNTransformation) |
| Prepare | Filter, equalization, frame selection, image stitching, mesh creation, application of various filters, super resolution. |
| Focus | Region detection and identification, background removal, crop, change detection, object proposal, saliency super pixel generation. |
| Perceive | Scene understanding and processing such as damage detection, object relation, object categories. |
| Quantity | Count object, compute change statistics. |

Figure 6:
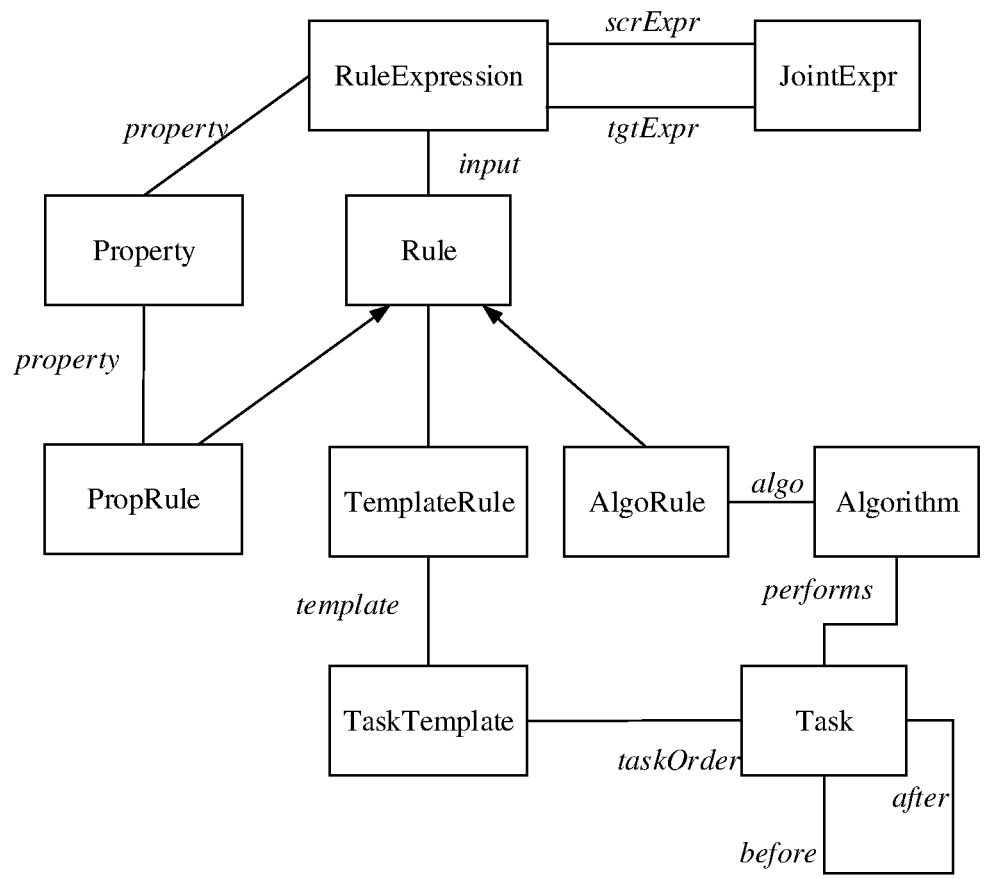
FIG. 6 is a block diagram representing a rule meta model according to some embodiments of the present disclosure.

In accordance with an embodiment of the present disclosure, the one or more processors 104 are configured to create a rule model, at step 308, based on a rule meta model. FIG. 6 is a block diagram representing a rule meta model according to some embodiments of the present disclosure. In an embodiment, the rule meta model is configured to capture knowledge pertaining to the DomainContext and wherein the rule model is characterized by a plurality of rules to express domain knowledge. In an embodiment, the plurality of rules are expressed using properties and values from the context model using RuleExpression. Multiple RuleExpression are connected using JointExpr. JointExpr connects RuleExpression with "AND", "OR" logical operators. In an embodiment, the types of rules include TemplateRule, AlgoRule and PropRule. TemplateRule represent rules for selecting the TaskTemplate from a list of TaskTemplates, for each of the plurality of tasks. TemplateRule are executed at the start of a pipeline construction process and recommends a suitable TaskTemplate for a given image processing problem. AlgoRule represent rules for selecting an algorithm from the one or more algorithms for performing an associated task in the TaskTemplate based on the context model. Particularly, AlgoRule specifies contextual conditions for use of an algorithm for performing a task. For each task in a TaskTemplate or TaskType, corresponding AlgoRule are executed to provide recommendations based on the context model. Task also specifies the execution order dependencies if any. This is used for generating rule's saliency information and hence the algorithm recommendations order. PropRule represent rules for updating properties of the one or more images based on execution of a selected algorithm. Particularly, PropRule specifies derivation of property value from other property values.

The orchestration engine of FIG. 2 provides instructions to the rule engine for executing specific rules. The orchestration engine first executes TemplateRule. If TaskTemplate recommendation is retrieved, then execution of subsequent rule is performed as per the task's order in the recommended template. If execution of the TemplateRule does not provide a TaskTemplate, the step of obtaining an order of execution of the plurality of tasks comprises using a default task type sequence of Transform, Prepare, Perceive, Focus, and Quantify.

In accordance with an embodiment of the present disclosure, the one or more processors 104 are configured to obtain, at step 310, the taskOrder representing an order of execution of the plurality of tasks by performing execution of the TemplateRule for selection of the TaskTemplate pertaining to the goalDescription.

In accordance with an embodiment of the present disclosure, the one or more processors 104 are configured to execute, at step 312, one or more rules from the plurality of rules corresponding to each of the plurality of tasks based on the obtained order of execution of the plurality of tasks to obtain a recommended algorithm for each of the plurality of tasks. The rules are validated against the context model information. InputContext information is dynamic and it gets updated when images undergo transformation on execution of the algorithms. Updates are considered for subsequent execution of the rules. PropRule are executed after every algorithm execution to cascade the effect of the changes in the context model. Multiple rules may satisfy conditional expressions that results into multiple recommendations. In an embodiment, the recommendations may be provided for user selection.

In accordance with an embodiment of the present disclosure, the one or more processors 104 are configured to execute, at step 314, the recommended algorithm for each of the plurality of tasks.

In accordance with an embodiment of the present disclosure, the one or more processors 104 are configured to validate, at step 316, the potential image processing pipeline to obtain a validated image processing pipeline corresponding to the input goal using a continually updated model based Knowledge Repository comprising the context meta model, the solution meta model, the rule meta model and algorithmic services corresponding to the one or more algorithms. In an embodiment, the step of validating the potential image processing pipeline comprises dynamically validating, on execution of the recommended algorithm an associated outcome for each of the plurality of tasks, at step 316A. In an embodiment, the validation includes validating input and output consistency. For instance, if an algorithm generates an output that is not compatible with a subsequent algorithm, the image processing pipeline is not valid. Again, image processing metrics may be utilized for validating the recommended algorithm. For instance, if an algorithm is supposed to increase edge density by a certain percentage and the outcome does not meet the requirements, the validation may fail. In an embodiment, on obtaining the recommended algorithm, the orchestration engine of FIG. 2 takes input parameters required for execution from a user, in the first instance, and invokes corresponding algorithm service. An output of a previous algorithm may be provided as a default value for one or more parameters as an input when executing a subsequent algorithm. In the scenario wherein precise parameters are not known, multiple iterations may be needed to refine parameter values. In an embodiment, the step of validating an outcome associated with the recommended algorithm comprises modifying the taskOrder based on the outcome associated with each of the recommended algorithm for each of the plurality of tasks.

In an embodiment, the step of validating the potential image processing pipeline also comprises dynamically validating, on execution of the one or more rules, the validity of the one or more rules corresponding to the plurality of tasks based on dynamic updation of InputContext of the context model, at step 316B. In an embodiment, the step of validating the one or more rules comprises executing PropRule to cascade the effects of changes in the context model as described above. In an embodiment, the step of executing the one or more rules is preceded by performing fuzzy transformation of numerical values associated with the input data to qualitative ranges.

During the step of validating the potential image processing pipeline, backtracking to previous task type for changing algorithm or algorithm parameters may be needed. The orchestration engine of FIG. 2 facilitates this by storing the state information execution to make it possible to go back to any number of previous tasks. Accordingly, in an embodiment, the step of validating the potential image processing pipeline comprises re-routing of the execution to a previous state of execution. In accordance with the present disclosure, each state of execution is a stack of state entries, wherein each state entry is a tuple comprising the TaskType, state of the context model characterized by the input properties, and {algorithm name, <parameter name, parameter value>}. The step of validating the potential image processing pipeline also generates trace information that contains trace of entire navigation from one state of execution to another, including re-routing, if any, in the validated image processing pipeline.

In accordance with an embodiment of the present disclosure, the one or more processors 104 are configured to generate, at step 318, a deployable code based on the validated image processing pipeline. In accordance with the present disclosure, the code generator of FIG. 2 is configured to generate the deployable code.

In accordance with an embodiment of the present disclosure, the one or more processors 104 are configured to continually update the Knowledge Repository, at step 320, with (i) the validated image processing pipeline, (ii) the deployable code, (iii) the context model, (iv) the potential image processing pipeline, (v) the rule model, (vi) each state of execution and (vii) trace information corresponding to navigation from one state of execution to another via the validated image processing pipeline.

Use Case

Mines and mining activities are regularly monitored for legal and environmental regulatory purposes. Anthropogenic activities related to mining adversely affect its surroundings. Degradation of green cover, encroachment on surrounding villages or towns are common problems. Monitoring expansion of the mining area is required for planning and other administrative activities of mine. Creating a pipeline of individual image processing algorithms or services in such a scenario is not a trivial task.

The challenges start from choosing a correct high-level task sequence (TaskTemplate). Change detection may be achieved by a simple image comparison as well as by a very complicated method such as the comparison of scene graphs of the two images. The system of the present disclosure recommends an appropriate sequence of tasks by selecting an appropriate template from a list of TaskTemplate. The choice is activated by the rules (TemplateRule), which bind an instance of the template to basic image properties. The chosen TaskTemplate states the tasks to be performed for each task category in a given situation. The change detection entails changes to be detected for LULC using coarse classification granularity. The change detection in mine areas over time does not often involve detection of objects. The broad level LULC classes such as soil, vegetation, built-up etc. are sufficient. An instance of the context meta model is created.

For the Problem.goalDescription=change detection, min area expansion or changes over time, the input data included two satellite images dated year 2013 and year 2016.

Input properties for the present use case may be characterized as below:
Processing Context.goalType="change detection"
InputContext.spatialResolution="moderate"
Spectral characteristics=multi
InputContext.spectralCharacteristics="multi"
DomainContext.domain="mine"
InputContext.atmosphericData=no
InptContext.platform=satellite
InputContext.singleDate=false
Processing Context.visualAnalysisRequired=false
Processing Context.aoi=RowColumn With reference to InputContext.spatialResolution="moderate", spatial resolution refers to ground sampling size. In the present use case, single pixels in the images received as part of the input data represents 30 m×30 m square.

With reference to Spectral characteristics=multi, solar energy is collected in multiple bands viz., visible, infrared, microwave, etc. multi indicates the data is multispectral and involves more band than just visible RGB bands.

An appropriate TaskTemplate with the sequence of LULC classification and image comparison is obtained by the system for the given input goal by executing TemplateRule. As described in method 300, the rules are dynamically validated based on dynamic updation of the InputContext of the context model by the PropRule.

TemplateRule for the present use case may be characterized as below: processingContext.classificationGranularity="coarse"=>TaskTemplate=LULC_change_detection
The task type sequence obtained: 1) Focus—Crop 2) Transform-DNTransformation, 3) Prepare—Filter 4) Perceive—RegionDetectionandIdentification 5) Quantify—ChangeStatistics.

PropRule for the present use case may be characterized as below:
1. ProcessingContext.goalType=="change detection" AND DomainContext.domain=="mine"=>Goal.goalType="LULC classification"
2. Goal.goalType=="LULC classification"=>processingContext.classifi-cationGranularity="coarse"
3. InputContext.spatialResolution=="moderate"=>processingContext.classificationGranularity="coarse"
4. InputContext.aerosolProfile==yes AND InputContext.co2Concentration==yes AND InputContext.h2oConcentration==yes AND=>InputContext.atmosphericData=yes It may be noted that both rules 2 and 3 above can set the processing context to "coarse". If the goal is change detection of mine, then LULC classification is adopted. If the goal is LULC classification, then the coarse classification is adopted. Examples of fine classification include building detection or car detection. Examples of coarse classification include forest region, agricultural region, urban region and the like. Accordingly, if the images received as part of the input data have moderate resolution, then coarse classification is adopted. Change detection related to mine may not always be LULC, it may be about fine changes in the mine area such as new buildings, etc. Hence unless and until it is known that coarse processing is sufficient, LULC change detection template cannot be selected. This explains how execution of TemplateRule for selection of the TaskTemplate pertaining to the goalDescription is critical.

Satellite images, received as part of input data, cover a large area (in this case). Processing the entire image is not computationally efficient. An appropriate attention model is required for selecting the sub image (ROI) for further processing. In an embodiment, the scope of the further processing may be defined by choosing the ROI using Latitude-Longitude or Cartesian coordinates (row and column). After choosing the ROI, for more accurate results, encoded digital numbers (DNs) or pixel values for all the bands (of the solar radiation spectrum viz., ultraviolet, visible (PAR), and infrared) need to be converted to radiance values. Each satellite platform provides calibration constants and they may be used to transform the DNs to radiance values. In the present use case, the property of the image acquisition platform is set as "satellite" determines the step for the transformation that requires the image received as digital image to be converted to radiance image.

AlgoRule for the present use case may be characterized as below:
1. ProcessingContext.aoi==latlong=>Focus.Crop.latlong
2. ProcessingContext.aoi==RowColumn=>Focus.Crop.RowColumn
3. InputContext.platform=="satellite"=>Transfrom.DNTransfromation. DNtoRadiance
4. ProcessingContext.visualAnalysisRequired==Yes=>Prepare.Filter.Linear
5. InputContext.atmosphericData==no=>Prepare.Filter.IAR
6. InputContext.atmosphericData==yes=>Prepare.Filter.6SV
7. ProcessingContext.classificationGranularity=="coarse"=>
   a. Perceive.RegionDetectionandIdentification.KNN
   b. Perceive.RegionDetectionandIdentification.SVM
8. ProcessingContext.goal=="LULC classification"=>Quantify. ChangeStatistics. ComputeChangeStatistics
9. InputContext.singleDateImage=false AND InputContext.spectralCharacteristics="multi"=>
   a. Prepare.Filter.DarkObject
   b. Prepare.Filter.SolarAngle With reference to ProcessingContext.aoi above, if the ROI (row and column) is known, in an embodiment, the system crops the image and the cropped image is used for further processing. With reference to InputContext.platform, the image acquisition platform is satellite (camera may be mounted on platform mounted on a drone, aircraft or satellite). The system converts the digital image to radiance image. Each pixel in the original (input data) image is represented as a digital number DN and is converted to radiance values (watts/area). This is required for radiometric correction and better accuracy.

With reference to Processing Context. visualAnalysisRequired, many image processing tasks are designed to enhance quality of the image for better visualization by human experts. If visualization is not required, then there are many tasks which may be performed without taking visual feedback from the user. Alternatively, certain tasks may be completely omitted.

As multi-date (2013 and 2016 dated images) imagery is involved in this use case, the atmospheric correction or normalization of the atmospheric effects (constraints) over multi-date image is necessary. Whether the atmospheric corrections are applied or not is decided by the system based on the input goal, nature of the imagery, spectral properties of the imagery, etc. For example, in the case of single date imagery and classification task, the atmospheric corrections may be ignored. It is however necessary for hyperspectral data and multi-date multispectral data. The atmospheric corrections are also of two types—physics-based methods and image-based methods. Physics-based methods need additional atmospheric data, which may not be easily available. In absence of such detailed information, image-based methods are a viable option.

With reference to InputContext.atmosphericData, if atmospheric data (such as gaseous concentration) is not available (which is required for accurate physics-based correction methods), the filter or correction method such as IAR (Internal Average Relative) Reflectance is adopted. If the atmospheric data is available, 6SV (a radiative transfer code that simulates the propagation of radiation through the atmosphere), a physics-based method may be used. However, in the present use case, since the InputContext.atmosphericData==no, this rule is not activated.

With reference to InputContext.singleDateImage=false AND InputContext.spectralCharacteristics="multi", since the images received as part of input data are multi dated (for change detection), and the data is multispectral, dark object removal methods and haze removal methods are applied along with solar angle correction.

With reference to Processing Context. classification Granularity=="coarse", as the granularity of the classification is coarse, the system adopts classifiers such as K-nearest neighbors (KNN) or Support Vector Machine (SVM).

Finally, a classification algorithm is to be selected. The image characteristics and the input goal determine the most suitable classification algorithm. Availability of training data is a limiting factor for deep learning approaches. In case, statistically significant ample training data is not available, feature based classification algorithm is an optimal choice. Once the classification algorithm is chosen, the comparison of the segmented images is a relatively straightforward job.

It may be noted that system selected "LULC_change_detection" template and executed rules are marked in bold above. With reference to the use case provided above, the obtained validated image processing pipeline is as shown below:
1) Focus—Crop—RowColumn
2) Transform—DNTransformation—DNtoRadiance
3) Prepare—Filter—SolarAngle
4) Prepare—Filter—Darkobject
5) Prepare—Filter—/AR
6) Perceive—RegionDetectionand Identification—SVM
7) Quantify—ChangeStatistics—ComputeChangeStatistics It was noted that efforts for creating the image processing pipeline for the use case provided was decreased by 70-80% (from 16 person weeks to approximately 3 person weeks) as compared to manual creation of the pipeline.

Systems and methods of the present disclosure facilitate creation of an image processing pipeline to avert dependency on subject matter experts and reduces time and effort involved in the process. The meta models described in the present disclosure are defined at high level of abstraction and do not cover specifics of image processing. The image processing domain knowledge has been externalized by the model-based approach provided. Firstly, TemplateRule is executed for selection of the TaskTemplate pertaining to the goalDescription. In case of no TaskTemplate, default task type sequence is considered. Prior to execution of rules corresponding to each of task, fuzzy transformation of numerical values associated with the input data to qualitative ranges may be performed. PropRule is executed to cascade effects of changes in the context model. AlgoRule corresponding to each task is executed. When the recommended algorithms are executed, input parameters are taken and appropriate algorithm service is executed. In an embodiment, human intervention may be utilized for selection of input parameters, validating the outcome of algorithm execution and re-routing of the execution, if needed. Execution of rules and recommended algorithm are accompanied by dynamic validation of the same. Based on the validated image processing pipeline corresponding to the input goal, a deployable code is generated that takes into consideration loading of appropriate library and instantiation of classes and invoking of algorithms in a required sequence.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for automatically creating an image processing pipeline, the method comprising the steps of:

receiving, via one or more hardware processors, an input data comprising an input goal and one or more images to be processed for achieving the input goal, the input data being characterized by a plurality of input properties corresponding to the input goal and the one or more images;

creating a context model, via the one or more hardware processors, in the form of an instance of a context meta model, wherein the context meta model is configured to capture context of a domain having a property goal-Description corresponding to the input goal, and wherein the context meta model is characterized by a plurality of types of contexts including (i) a Domain-Context representing domain related information, (ii) an InputContext representing information pertaining to the one or more images and (iii) a ProcessingContext representing information pertaining to the one or more hardware processors;

creating a potential image processing pipeline, via the one or more hardware processors, based on a solution meta model, wherein the solution meta model is characterized by one or more algorithms associated with the DomainContext for performing a plurality of tasks corresponding to the input goal, and wherein each of the plurality of tasks are associated with (i) a TaskType from a plurality of TaskTypes (ii) a TaskTemplate representing a reusable task sequence for the input data using a taskOrder and (iii) the one or more algorithms for performing an associated task;

creating a rule model, via the one or more hardware processors based on a rule meta model, wherein the rule meta model is configured to capture knowledge pertaining to the DomainContext and wherein the rule model is characterized by a plurality of rules of types including (i) TemplateRule representing rules for selecting the TaskTemplate from a list of TaskTemplate, for each of the plurality of tasks, (ii) AlgoRule representing rules for selecting an algorithm from the one or more algorithms for performing an associated task in the TaskTemplate based on the context model and (iii) PropRule representing rules for updating properties of the one or more images based on execution of a selected algorithm;

obtaining, via the one or more hardware processors, the taskOrder representing an order of execution of the plurality of tasks by performing execution of the TemplateRule for selection of the TaskTemplate pertaining to the goalDescription;

executing, via the one or more hardware processors, one or more rules from the plurality of rules, comprised in AlgoRule, corresponding to each of the plurality of tasks based on the obtained order of execution of the plurality of tasks to obtain a recommended algorithm for each of the plurality of tasks;

executing, via the one or more hardware processors, the recommended algorithm for each of the plurality of tasks; and validating, via the one or more hardware processors, the potential image processing pipeline to obtain a validated image processing pipeline corresponding to the input goal using a continually updated model based Knowledge Repository comprising the context meta model, the solution meta model, the rule meta model and algorithmic services corresponding to the one or more algorithms, by dynamically performing:
on execution of the recommended algorithm, validating an outcome associated thereof for each of the plurality of tasks for input and output consistency; and
on execution of the one or more rules, validating the one or more rules corresponding to each of the plurality of tasks based on dynamic updation of the InputContext of the context model.

2. The processor implemented method of claim 1, further comprising:
generating a deployable code based on the validated image processing pipeline; and
continually updating the Knowledge Repository with (i) the validated image processing pipeline, (ii) the deployable code, (iii) the context model, (iv) the potential image processing pipeline, (v) the rule model, (vi) each state of execution as a stack of state entries, wherein each state entry is a tuple comprising the TaskType, state of the context model characterized by the input properties, and {algorithm name, <parameter name, parameter value>} and (vii) trace information corresponding to navigation from one state of execution to another via the validated image processing pipeline.

3. The processor implemented method of claim 1, wherein the step of execution of the recommended algorithm comprises providing an output of a previous algorithm as a default value for one or more parameters as an input while executing a subsequent algorithm.

4. The processor implemented method of claim 2, wherein the step of validating the potential image processing pipeline comprises re-routing of the execution to a previous state of execution.

5. The processor implemented method of claim 1, wherein the step of validating an outcome associated with the recommended algorithm comprises modifying the taskOrder based on the outcome associated with each of the recommended algorithm for each of the plurality of tasks.

6. The processor implemented method of claim 1, wherein the step of executing the one or more rules is preceded by performing fuzzy transformation of numerical values associated with the input data to qualitative ranges.

7. The processor implemented method of claim 1, wherein the step of validating the one or more rules comprises executing the PropRule to cascade effects of changes in the context model.

8. The processor implemented method of claim 1, wherein (i) the domain related information comprises business domain and domain objects details; (ii) the information pertaining to the one or more images comprises image spectral and spatial characteristics, image contrast level, edge density, image format, noise information; band related information including directivity, entropy, linearity, periodicity, size and length; and sensor related information including azimuth angle, band width, interval at which the one or more images are taken, look angle, spatial and temporal resolution and zenith angle; and (iii) the information pertaining to the one or more hardware processors comprises processing related constraints including time constraint, batch or parallel processing and processing window size.

9. The processor implemented method of claim 1, wherein the plurality of TaskTypes include Transform, Prepare, Focus, Perceive and Quantify, wherein Transform and Prepare are configured to preprocess the one or more images to obtain transformed one or more images for further processing, Focus is configured to highlight regions of interest (ROIs) in the transformed one or more images and Perceive and Quantify are configured to interpret the ROIs in the one or more images to generate a required output for achieving the input goal, the ROIs being comprised in the plurality of input properties.

10. The processor implemented method of claim 1, wherein the plurality of rules are expressed using properties and values from the context model using RuleExpression.

11. The processor implemented method of claim 9, wherein the step of obtaining an order of execution of the plurality of tasks comprises using a default task type sequence of Transform, Prepare, Perceive, Focus, and Quantify if execution of the TemplateRule does not provide a TaskTemplate.

12. A system for automatically creating an image processing pipeline, the system comprising one or more data storage devices operatively coupled to one or more hardware processors and configured to store instructions configured for execution by the one or more hardware processors to:
receive an input data comprising an input goal and one or more images to be processed for achieving the input goal, the input data being characterized by a plurality of input properties corresponding to the input goal and the one or more images;
create a context model in the form of an instance of a context meta model, wherein the context meta model is configured to capture context of a domain having a property goalDescription corresponding to the input goal, and wherein the context meta model is characterized by a plurality of types of contexts including (i) a DomainContext representing domain related information, (ii) an InputContext representing information pertaining to the one or more images and (iii) a ProcessingContext representing information pertaining to the one or more hardware processors;
create a potential image processing pipeline, based on a solution meta model, wherein the solution meta model is characterized by one or more algorithms associated with the DomainContext for performing a plurality of tasks corresponding to the input goal, and wherein each of the plurality of tasks are associated with (i) a TaskType from a plurality of TaskTypes (ii) a TaskTemplate representing a reusable task sequence for the input data using a taskOrder and (iii) the one or more algorithms for performing an associated task;
create a rule model based on a rule meta model, wherein the rule meta model is configured to capture knowledge pertaining to the DomainContext and wherein the rule model is characterized by a plurality of rules of types including (i) TemplateRule representing rules for selecting the TaskTemplate from a list of TaskTemplate, for each of the plurality of tasks, (ii) AlgoRule representing rules for selecting an algorithm from the one or more algorithms for performing an associated task in the TaskTemplate based on the context model and (iii) PropRule representing rules for updating properties of the one or more images based on execution of a selected algorithm;
obtain the taskOrder representing an order of execution of the plurality of tasks by performing execution of the TemplateRule for selection of the TaskTemplate pertaining to the goalDescription; and
execute one or more rules from the plurality of rules, comprised in AlgoRule, corresponding to each of the plurality of tasks based on the obtained order of execution of the plurality of tasks to obtain a recommended algorithm for each of the plurality of tasks;
execute the recommended algorithm for each of the plurality of tasks; and
validate the potential image processing pipeline to obtain a validated image processing pipeline corresponding to the input goal using a continually updated model based Knowledge Repository comprised in the one or more data storage devices, the Knowledge Repository comprising the context meta model, the solution meta model, the rule meta model and algorithmic services corresponding to the one or more algorithms, by dynamically performing:
on execution of the recommended algorithm, validating an outcome associated thereof for each of the plurality of tasks for input and output consistency; and
on execution of the one or more rules, validating the one or more rules corresponding to each of the plurality of tasks based on dynamic updation of the InputContext of the context model.

13. The system of claim 12, wherein the one or more hardware processors are further configured to:
generate a deployable code based on the validated image processing pipeline; and
continually update the Knowledge Repository with (i) the validated image processing pipeline, (ii) the deployable code, (iii) the context model, (iv) the potential image processing pipeline, (v) the rule model, (vi) each state of execution as a stack of state entries, wherein each state entry is a tuple comprising the TaskType, state of the context model characterized by the input properties, and {algorithm name, <parameter name, parameter value>} and (vii) trace information corresponding to navigation from one state of execution to another via the validated image processing pipeline.

14. The system of claim 12, wherein (i) the domain related information comprises business domain and domain objects details; (ii) the information pertaining to the one or more images comprises image spectral and spatial characteristics, image contrast level, edge density, image format, noise information; band related information including directivity, entropy, linearity, periodicity, size and length; and sensor related information including azimuth angle, band width, interval at which the one or more images are taken, look angle, spatial and temporal resolution and zenith angle; and (iii) the information pertaining to the one or more hardware processors comprises processing related constraints including time constraint, batch or parallel processing and processing window size.

15. The system of claim 12, wherein the plurality of TaskTypes include Transform, Prepare, Focus, Perceive and Quantify, wherein Transform and Prepare are configured to preprocess the one or more images to obtain transformed one or more images for further processing, Focus is configured to highlight regions of interest (ROIs) in the transformed one or more images and Perceive and Quantify are configured to interpret the ROIs in the one or more images to generate a required output for achieving the input goal, the ROIs being comprised in the plurality of input properties.

16. The system of claim 13, wherein the one or more hardware processors are further configured to re-route the execution to a previous state of execution when validating the potential image processing pipeline.

17. The system of claim 12, wherein the one or more hardware processors are further configured to perform one or more of: validating an outcome associated with the recommended algorithm by modifying the taskOrder based on the outcome associated with each of the recommended algorithm for each of the plurality of tasks; performing fuzzy transformation of numerical values associated with the input data to qualitative ranges prior to executing the one or more rules; and executing the PropRule to cascade effects of changes in the context model when validating the one or more rules.

18. The system of claim 15, wherein the one or more hardware processors are further configured to obtain an order of execution of the plurality of tasks comprises using a default task type sequence of Transform, Prepare, Perceive, Focus, and Quantify if execution of the TemplateRule does not provide a TaskTemplate.

19. A computer program product comprising a non-transitory computer readable medium having a computer readable program embodied therein, wherein the computer readable program, when executed on a computing device, causes the computing device to:
   receive, via one or more processors, an input data comprising an input goal and one or more images to be processed for achieving the input goal, the input data being characterized by a plurality of input properties corresponding to the input goal and the one or more images;
   create a context model in the form of an instance of a context meta model, wherein the context meta model is configured to capture context of a domain having a property goalDescription corresponding to the input goal, and wherein the context meta model is characterized by a plurality of types of contexts including (i) a DomainContext representing domain related information, (ii) an InputContext representing information pertaining to the one or more images and (iii) a ProcessingContext representing information pertaining to the one or more hardware processors;
   create a potential image processing pipeline, based on a solution meta model, wherein the solution meta model is characterized by one or more algorithms associated with the DomainContext for performing a plurality of tasks corresponding to the input goal, and wherein each of the plurality of tasks are associated with (i) a TaskType from a plurality of TaskTypes (ii) a TaskTemplate representing a reusable task sequence for the input data using a taskOrder and (iii) the one or more algorithms for performing an associated task;
   create a rule model based on a rule meta model, wherein the rule meta model is configured to capture knowledge pertaining to the DomainContext and wherein the rule model is characterized by a plurality of rules of types including (i) TemplateRule representing rules for selecting the TaskTemplate from a list of TaskTemplate, for each of the plurality of tasks, (ii) AlgoRule representing rules for selecting an algorithm from the one or more algorithms for performing an associated task in the TaskTemplate based on the context model and (iii) PropRule representing rules for updating properties of the one or more images based on execution of a selected algorithm;
   obtain the taskOrder representing an order of execution of the plurality of tasks by performing execution of the TemplateRule for selection of the TaskTemplate pertaining to the goalDescription; and
   execute one or more rules from the plurality of rules, comprised in AlgoRule, corresponding to each of the plurality of tasks based on the obtained order of execution of the plurality of tasks to obtain a recommended algorithm for each of the plurality of tasks;
   execute the recommended algorithm for each of the plurality of tasks; and
   validate the potential image processing pipeline to obtain a validated image processing pipeline corresponding to the input goal using a continually updated model based Knowledge Repository comprised in the one or more data storage devices, the Knowledge Repository comprising the context meta model, the solution meta model, the rule meta model and algorithmic services corresponding to the one or more algorithms, by dynamically performing:
      on execution of the recommended algorithm, validating an outcome associated thereof for each of the plurality of tasks for input and output consistency; and
      on execution of the one or more rules, validating the one or more rules corresponding to each of the plurality of tasks based on dynamic updation of the InputContext of the context model.

20. The computer program product of claim 19, wherein the computer readable program further causes the computing device to:
   generate a deployable code based on the validated image processing pipeline; and
   continually update the Knowledge Repository with (i) the validated image processing pipeline, (ii) the deployable code, (iii) the context model, (iv) the potential image processing pipeline, (v) the rule model, (vi) each state of execution as a stack of state entries, wherein each state entry is a tuple comprising the TaskType, state of the context model characterized by the input properties, and {algorithm name, <parameter name, parameter value>} and (vii) trace information corresponding to navigation from one state of execution to another via the validated image processing pipeline.

* * * * *